US012362486B2

(12) United States Patent
Chang et al.

(10) Patent No.: US 12,362,486 B2
(45) Date of Patent: Jul. 15, 2025

(54) ANTENNA STRUCTURE

(71) Applicant: Wistron NeWeb Corp., Hsinchu (TW)

(72) Inventors: Wei-Chung Chang, Hsinchu (TW); Shang-Ching Tseng, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 174 days.

(21) Appl. No.: 18/489,072

(22) Filed: Oct. 18, 2023

(65) Prior Publication Data

US 2024/0162618 A1 May 16, 2024

(30) Foreign Application Priority Data

Nov. 15, 2022 (TW) ................................ 111143468

(51) Int. Cl.

| | |
|---|---|
| ***H01Q 1/24*** | (2006.01) |
| ***H01Q 1/38*** | (2006.01) |
| ***H01Q 5/20*** | (2015.01) |
| ***H01Q 5/314*** | (2015.01) |
| ***H01Q 9/04*** | (2006.01) |
| ***H01Q 23/00*** | (2006.01) |

(52) U.S. Cl.

CPC ............ *H01Q 9/0442* (2013.01); *H01Q 5/20* (2015.01); *H01Q 5/314* (2015.01); *H01Q 23/00* (2013.01)

(58) Field of Classification Search

CPC .. H01Q 1/24; H01Q 1/38; H01Q 1/48; H01Q 23/00; H01Q 5/20; H01Q 5/31; H01Q 5/314; H01Q 5/32; H01Q 5/328; H01Q 5/37; H01Q 5/378; H01Q 9/04; H01Q 9/0442

See application file for complete search history.

(56) References Cited

U.S. PATENT DOCUMENTS

| | | | | |
|---|---|---|---|---|
| 9,923,263 | B2 * | 3/2018 | Yen | H01Q 9/0421 |
| 10,522,902 | B1 * | 12/2019 | Tseng | H01Q 1/48 |
| 11,075,460 | B2 * | 7/2021 | Yu | H01Q 13/16 |
| 11,128,050 | B1 * | 9/2021 | Chuang | H01Q 5/371 |
| 11,139,559 | B2 * | 10/2021 | Wei | H01Q 5/364 |
| 11,264,699 | B2 * | 3/2022 | Chang | H01Q 1/2291 |
| 11,588,245 | B2 | 2/2023 | Wei | |

FOREIGN PATENT DOCUMENTS

| | | |
|---|---|---|
| TW | 201902032 A | 1/2019 |
| TW | 202021188 A | 6/2020 |

* cited by examiner

*Primary Examiner* — Tho G Phan

(74) *Attorney, Agent, or Firm* — McClure, Qualey & Rodack, LLP

(57) ABSTRACT

An antenna structure includes a metal mechanism element, a ground element, a feeding radiation element, a first radiation element, a second radiation element, a parasitic radiation element, a tuning circuit, and a nonconductive support element. The metal mechanism element has a slot. The metal mechanism element includes a first grounding portion and a second grounding portion. The slot is positioned between the first grounding portion and the second grounding portion. The feeding radiation element has a feeding point. The first radiation element is coupled to the feeding radiation element. The second radiation element is coupled to the feeding radiation element. The parasitic radiation element is coupled to the ground element. The parasitic radiation element is adjacent to the first radiation element and the second radiation element. The tuning circuit is coupled between the first grounding portion and the second grounding portion of the metal mechanism element.

20 Claims, 6 Drawing Sheets

100

100

ANTENNA STRUCTURE

CROSS REFERENCE TO RELATED APPLICATIONS

This application claims priority of Taiwan Patent Application No. 111143468 filed on Nov. 15, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient bandwidth, it will degrade the communication quality of the relative mobile device. Accordingly, it has become a critical challenge for antenna designers to design a small-size, wideband antenna element.

BRIEF SUMMARY OF THE INVENTION

In an exemplary embodiment, the invention is directed to an antenna structure that includes a metal mechanism element, a ground element, a feeding radiation element, a first radiation element, a second radiation element, a parasitic radiation element, a tuning circuit, and a nonconductive support element. The metal mechanism element has a slot. The metal mechanism element includes a first grounding portion and a second grounding portion. The slot is positioned between the first grounding portion and the second grounding portion. The feeding radiation element has a feeding point. The first radiation element is coupled to the feeding radiation element. The second radiation element is coupled to the feeding radiation element. The second radiation element and the first radiation element substantially extend in opposite directions. The parasitic radiation element is coupled to the ground element. The parasitic radiation element is adjacent to the first radiation element and the second radiation element. The tuning circuit is coupled between the first grounding portion and the second grounding portion of the metal mechanism element. The nonconductive support element is configured to carry the ground element, the feeding radiation element, the first radiation element, the second radiation element, the parasitic radiation element, and the tuning circuit.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
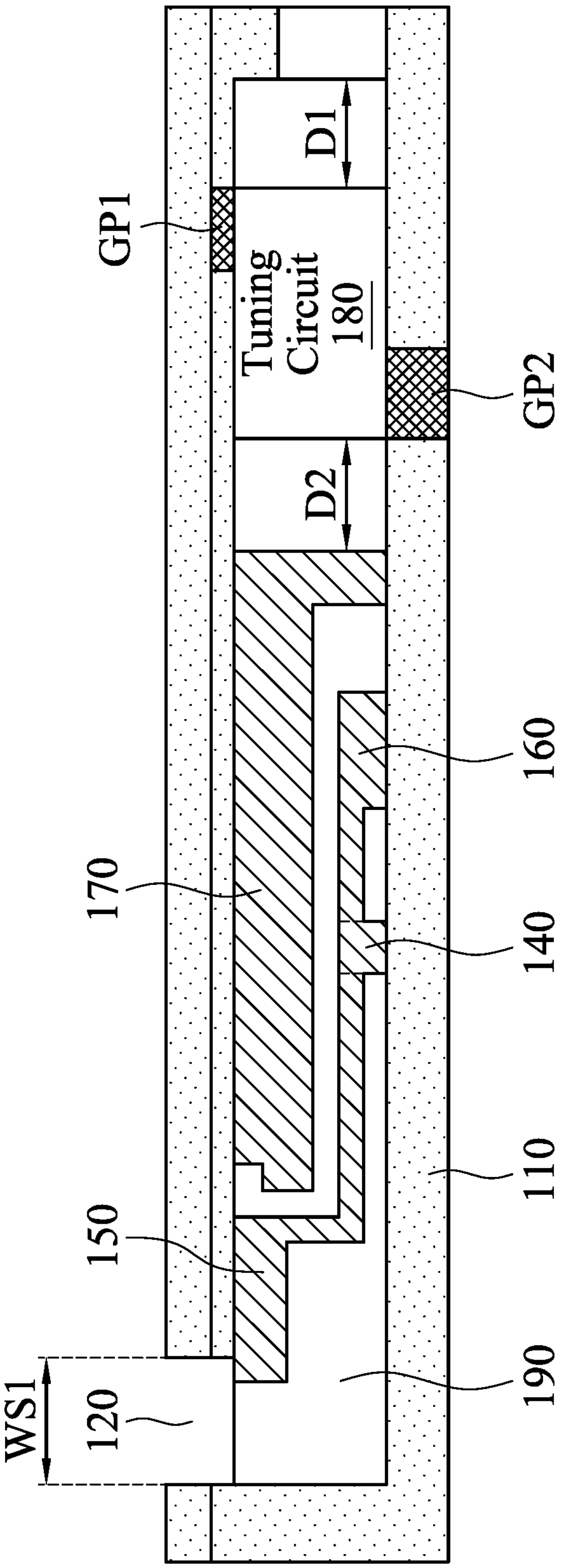
FIG. 1 is a front view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
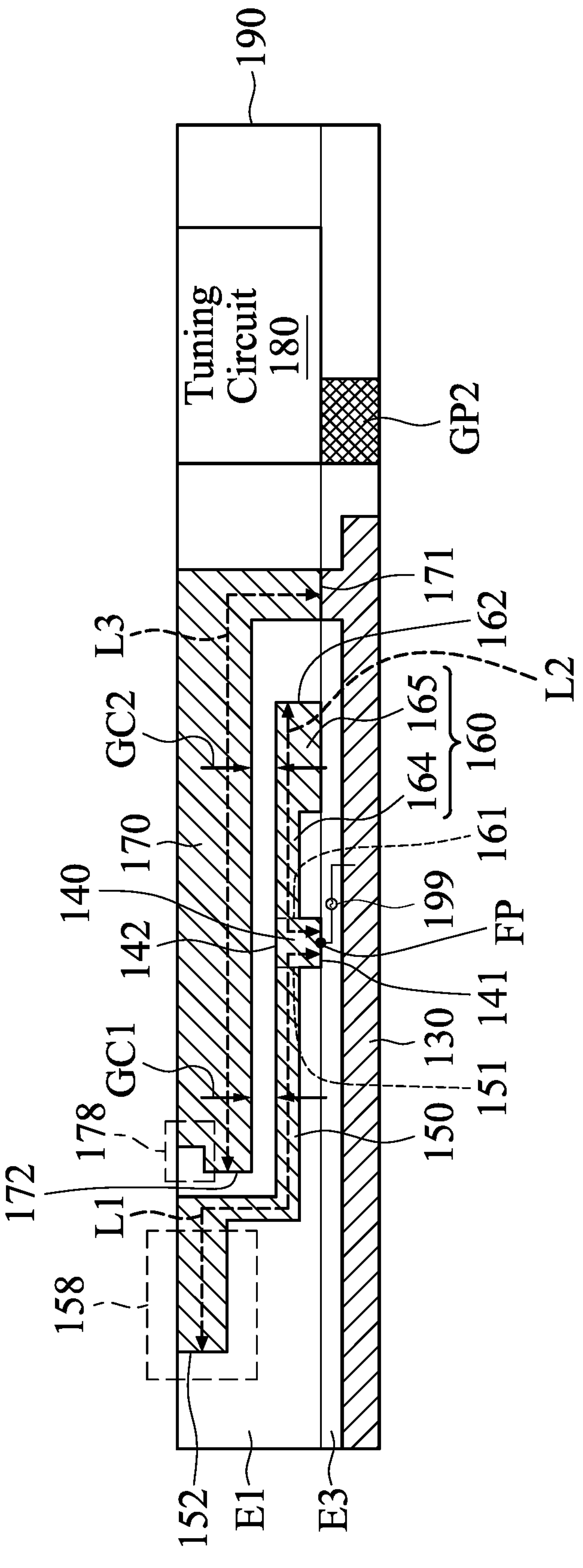
FIG. 2 is a partially perspective view of an antenna structure according to an embodiment of the invention.
Figure 3:
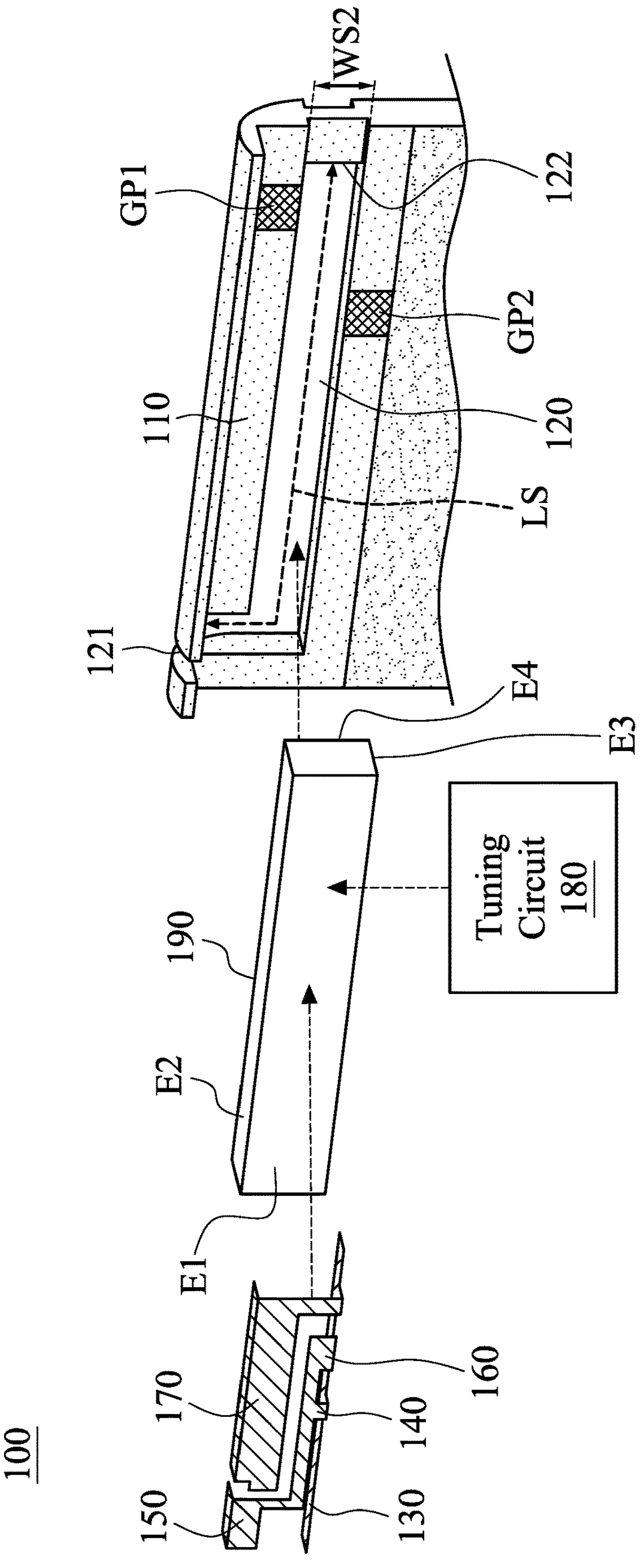
FIG. 3 is an exploded view of an antenna structure according to an embodiment of the invention.

FIG. 1 is a front view of an antenna structure 100 according to an embodiment of the invention. FIG. 2 is a partially perspective view of the antenna structure 100 according to an embodiment of the invention. FIG. 3 is an exploded view of the antenna structure 100 according to an embodiment of the invention. Please refer to FIG. 1, FIG. 2, and FIG. 3 together. The antenna structure 100 may be applied to a mobile device, such as a smartphone, a tablet computer, or a notebook computer. In the embodiment of FIG. 1, FIG. 2, and FIG. 3, the antenna structure 100 includes a metal mechanism element 110, a ground element 130, a feeding radiation element 140, a first radiation element 150, a second radiation element 160, a parasitic radiation element 170, a tuning circuit 180, and a nonconductive support element 190. The ground element 130, the feeding radiation element 140, the first radiation element 150, the second radiation element 160, and the parasitic radiation element 170 may all be made of metal materials, such as copper, silver, aluminum, iron, or their alloys.

The shape and type of the metal mechanism element 110 are not limited in the invention. For example, if the antenna structure 100 is applied in a notebook computer, the metal mechanism element 110 may be a metal back cover of the notebook computer, but it is not limited thereto. The metal mechanism element 110 has a slot 120. The slot 120 of the metal mechanism element 110 may substantially have an L-shape. Specifically, the slot 120 may be an open slot, and it may have a relatively wide open end 121 and a relatively narrow closed end 122.

In addition, the metal mechanism element 110 further includes a first grounding portion GP1 and a second grounding portion GP2, and the slot 120 is positioned between the first grounding portion GP1 and the second grounding portion GP2. For example, each of the first grounding portion GP1 and the second grounding portion GP2 may be implemented with a metal extension element coupled to the body of the metal mechanism element 110, but it is not limited thereto. In some embodiments, the antenna structure 100 further includes a nonconductive material (not shown), which fills the slot 120 of the metal mechanism element 110 so as to achieve a waterproof or dustproof function.

For example, the nonconductive support element 190 may be made of a plastic material. The nonconductive support element 190 is configured to carry the ground element 130, the feeding radiation element 140, the first radiation element 150, the second radiation element 160, the parasitic radiation element 170, and the tuning circuit 180. The nonconductive support element 190 has a first surface E1 and a fourth surface E4 which are opposite to each other, and also has a second surface E2 and a third surface E3 which are adjacent thereto. The first surface E1 is positioned between the second surface E2 and the third surface E3. Both the second surface E2 and the third surface E3 are substantially perpendicular to the first surface E1.

Specifically, both the first radiation element 150 and the parasitic radiation element 170 extend from the first surface E1 onto the second surface E2 of the nonconductive support element 190. The feeding radiation element 140, the second radiation element 160, and the tuning circuit 180 are all disposed on the first surface E1 of the nonconductive support element 190. The ground element 130 is disposed on the third surface E3 of the nonconductive support element 190. Furthermore, the fourth surface E4 of the nonconductive support element 190 is adjacent to the slot 120 of the metal mechanism element 110. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). In some embodiments, the fourth surface E4 of the nonconductive support element 190 is directly attached to the metal mechanism element 110, such that the nonconductive support element 190 at least partially covers the slot 120 of the metal mechanism element 110.

In some embodiments, the first grounding portion GP1 of the metal mechanism element 110 extends onto the second surface E2 of the nonconductive support element 190, and the second grounding portion GP2 of the metal mechanism element 110 extends onto the third surface E3 of the nonconductive support element 190, but they are not limited thereto. In alternative embodiments, the ground element 130, the feeding radiation element 140, the first radiation element 150, the second radiation element 160, the parasitic radiation element 170, and the tuning circuit 180 are merely disposed on the same surface of the nonconductive support element 190, such as any of the first surface E1, the second surface E2, the third surface E3, and the fourth surface E4.

The ground element 130 and the metal mechanism element 110 may be coupled with each other. The shape of the ground element 130 is not limited in the invention. For example, the ground element 130 may be implemented with a ground copper foil. In some embodiments, the ground element 130 extends from the third surface E3 of the nonconductive support element 190 onto the metal mechanism element 110.

The feeding radiation element 140 may substantially have a rectangular shape. Specifically, the feeding radiation element 140 has a first end 141 and a second end 142. A feeding point FP is positioned at the first end 141 of the feeding radiation element 140. The feeding point FP may be further coupled to a signal source 199. For example, the signal source 199 may be as an RF (Radio Frequency) module for exciting the antenna structure 100. In some embodiments, the feeding radiation element 140 has a first vertical projection on the metal mechanism element 110, and the first vertical projection at least partially overlaps the slot 120 of the metal mechanism element 110.

The first radiation element 150 may substantially have a Z-shape. Specifically, the first radiation element 150 has a first end 151 and a second end 152. The first end 151 of the first radiation element 150 is coupled to the second end 142 of the feeding radiation element 140. The second end 152 of the first radiation element 150 is an open end. In some embodiments, the first radiation element 150 further includes a terminal widening portion 158, which is positioned at the second end 152 of the first radiation element 150. In some embodiments, the first radiation element 150 has a second vertical projection on the metal mechanism element 110, and the second vertical projection at least partially overlaps the slot 120 of the metal mechanism element 110.

The second radiation element 160 may substantially have a variable-width straight-line shape. Specifically, the second radiation element 160 has a first end 161 and a second end 162. The first end 161 of the second radiation element 160 is coupled to the second end 142 of the feeding radiation element 140. The second end 162 of the second radiation element 160 is an open end. For example, the second end 162 of the second radiation element 160 and the second end 152 of the first radiation element 150 may substantially extend in opposite directions and away from each other. In some embodiments, the second radiation element 160 includes a narrow portion 164 adjacent to the first end 161 and a wide portion 165 adjacent to the second end 162, and the wide portion 165 is coupled through the narrow portion 164 to the feeding radiation element 140. In some embodiments, the second radiation element 160 has a third vertical projection on the metal mechanism element 110, and the third vertical projection at least partially overlaps the slot 120 of the metal mechanism element 110.

The parasitic radiation element 170 may substantially have an L-shape. Specifically, the parasitic radiation element 170 has a first end 171 and a second end 172. The first end 171 of the parasitic radiation element 170 is coupled to the ground element 130. The second end 172 of the parasitic radiation element 170 is an open end. For example, the second end 172 of the parasitic radiation element 170 and the second end 152 of the first radiation element 150 may substantially extend in the same direction. In addition, the parasitic radiation element 170 is adjacent to the first radiation element 150 and the second radiation element 160. A first coupling gap GC1 may be formed between the parasitic radiation element 170 and the first radiation element 150. A second coupling gap GC2 may be formed between the parasitic radiation element 170 and the second radiation element 160. In some embodiments, the parasitic radiation element 170 further has a corner notch 178, which is positioned at the second end 172 of the parasitic radiation element 170. For example, the aforementioned corner notch 178 may substantially have a rectangular shape or a square shape. In some embodiments, the parasitic radiation element 170 has a fourth vertical projection on the metal mechanism element 110, and the fourth vertical projection at least partially overlaps the slot 120 of the metal mechanism element 110.

The tuning circuit 180 is coupled between the first grounding portion GP1 and the second grounding portion GP2 of the metal mechanism element 110. The internal structure of the tuning circuit 180 is not limited in the invention. For example, the tuning circuit 180 may include a switch circuit, one or more inductors, one or more capacitors, and/or one or more resistors, but it is not limited thereto. In some embodiments, the tuning circuit 180 has a fifth vertical projection on the metal mechanism element 110, and the fifth vertical projection at least partially overlaps the slot 120 of the metal mechanism element 110.

Figure 4:
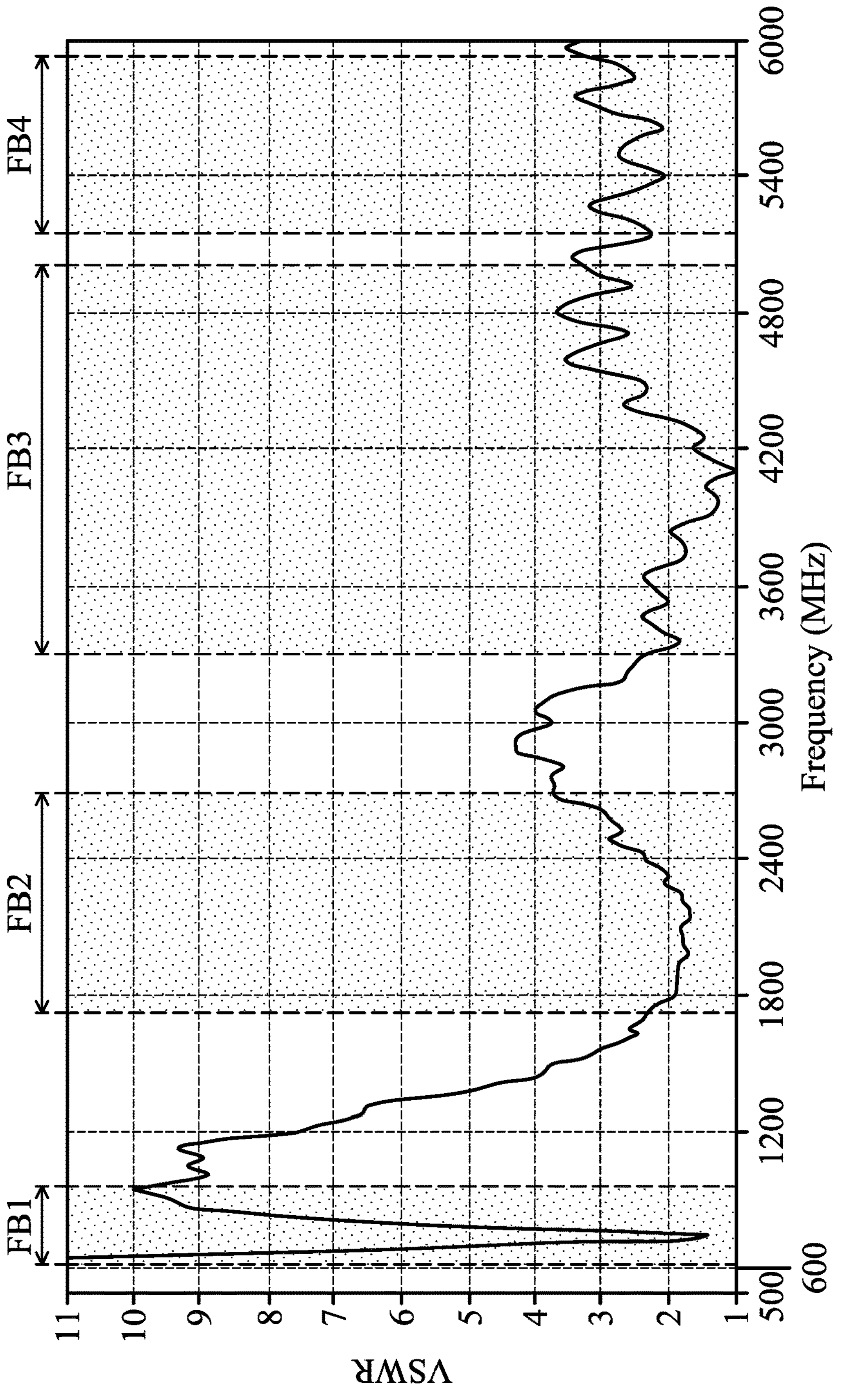
FIG. 4 is a diagram of VSWR (Voltage Standing Wave Ratio) of an antenna structure according to an embodiment of the invention.

FIG. 4 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 4, the antenna structure 100 can cover a first frequency band FB1, a second frequency band FB2, a third frequency band FB3, and a fourth frequency band FB4. For example, the first frequency band FB1 may be from 617 MHz to 960 MHz, the second frequency band FB2 may be from 1710 MHz to 2690 MHz, the third frequency band FB3 may be from 3300 MHz to 5000 MHz, and the fourth frequency band FB4 may be from 5150 MHz to 5925 MHz. Accordingly, the antenna structure 100 can support at least the sub-6 GHz wideband operations of the next 5G (5th Generation Wireless System) communication.

In some embodiments, the operational principles of the antenna structure 100 will be described as follows. The slot 120 of the metal mechanism element 110 is excited to generate the first frequency band FB1. The feeding radiation element 140 and the first radiation element 150 are excited to generate the second frequency band FB2. The feeding radiation element 140 and the second radiation element 160 are excited to generate a fundamental resonant mode, thereby forming the third frequency band FB3. The feeding radiation element 140 and the second radiation element 160 are also excited to generate a higher-order resonant mode, thereby forming the fourth frequency band FB4. The parasitic radiation element 170 is excited by the first radiation element 150 and the second radiation element 160 using a coupling mechanism, so as to increase the operational bandwidths of the second frequency band FB2, the third frequency band FB3, and the fourth frequency band FB4. According to practical measurements, the terminal widening portion 158 of the first radiation element 150 is configured to fine-tune the impedance matching of the second frequency band FB2. The variable-width design of the second radiation element 160 is configured to fine-tune the impedance matching of the third frequency band FB3. In addition, the corner notch 178 of the parasitic radiation element 170 is also configured to fine-tune the impedance matching of the second frequency band FB2.

In some embodiments, the element sizes of the antenna structure 100 will be described as follows. The length LS of the slot 120 of the metal mechanism element 110 may be substantially equal to 0.25 wavelength (λ/4) of the first frequency band FB1 of the antenna structure 100. The width WS1 of the open end 121 of the slot 120 may be from 4 mm to 6 mm. The width WS2 of the closed end 122 of the slot 120 may be from 2 mm to 4 mm. The total length L1 of the feeding radiation element 140 and the first radiation element 150 may be substantially equal to 0.25 wavelength (λ/4) of the second frequency band FB2 of the antenna structure 100. The total length L2 of the feeding radiation element 140 and the second radiation element 160 may be substantially equal to 0.25 wavelength (λ/4) of the third frequency band FB3 of the antenna structure 100. The length L3 of the parasitic radiation element 170 may be substantially equal to 0.25 wavelength (λ/4) of the second frequency band FB2 of the antenna structure 100. The width of the first coupling gap GC1 may be from 0.8 mm to 1.2 mm. The width of the second coupling gap GC2 may be from 0.8 mm to 1.2 mm. The distance D1 between the tuning circuit 180 and the closed end 122 of the slot 120 may be from 3 mm to 7 mm. The distance D2 between the tuning circuit 180 and the parasitic radiation element 170 may be from 3 mm to 7 mm. The above ranges of element sizes are calculated and obtained according to many experiment results, and they help to optimize the operational bandwidth and impedance matching of the antenna structure 100.

Figure 5:
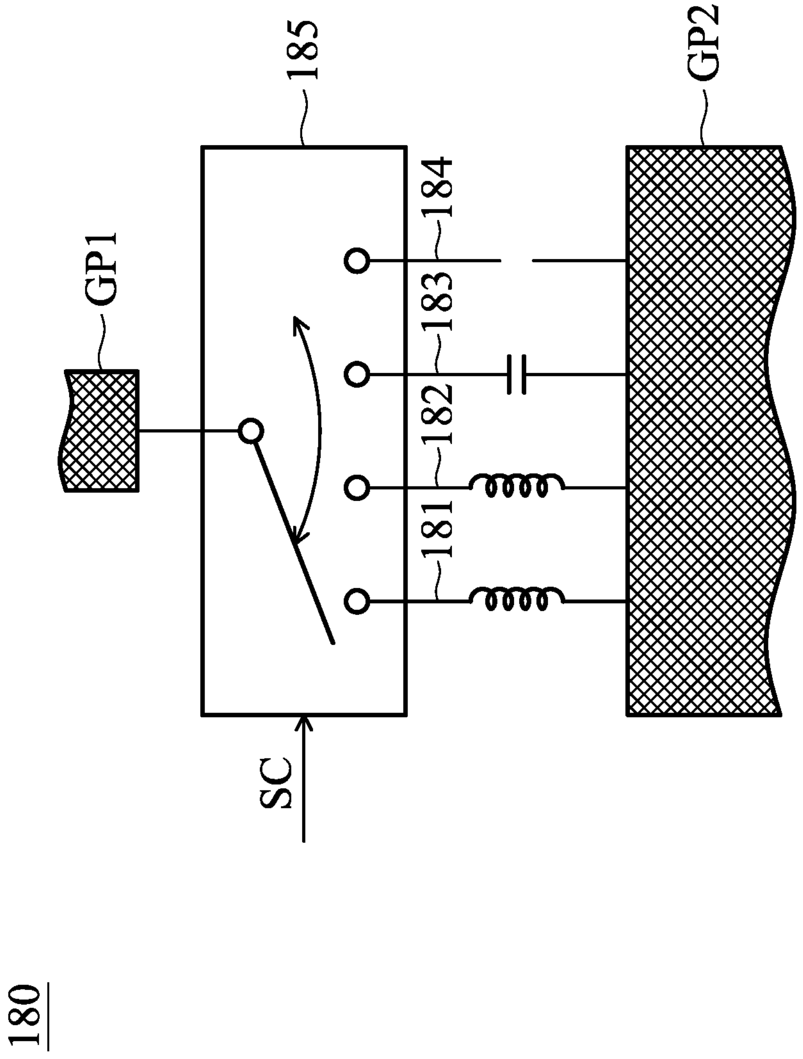
FIG. 5 is a diagram of a tuning circuit according to an embodiment of the invention.

FIG. 5 is a diagram of the tuning circuit 180 according to an embodiment of the invention. In the embodiment of FIG. 5, the tuning circuit 180 includes a first inductive element 181, a second inductive element 182, a capacitive element 183, an open-circuited element 184, and a selection circuit 185. The inductance of the first inductive element 181 may be greater than that of the second inductive element 182.

Specifically, one terminal of the selection circuit 185 is coupled to the first grounding portion GP1, and the other terminal of the selection circuit 185 is switchable between the first inductive element 181, the second inductive element 182, the capacitive element 183, and the open-circuited element 184 according to a control signal SC. Furthermore, the first inductive element 181, the second inductive element 182, the capacitive element 183, and the open-circuited element 184 are respectively coupled to the second grounding portion GP2.

Generally, the selection circuit 185 can select one of the first inductive element 181, the second inductive element 182, the capacitive element 183, and the open-circuited element 184 as a target element according to the control signal SC. The selected target element is coupled between the first grounding portion GP1 and the second grounding portion GP2 of the metal mechanism element 110. For example, the control signal SC may be generated by a processor (not shown) according to a user input, but it is not limited thereto. In some embodiments, the inductance of the first inductive element 181 is from 8 nH to 12 nH, the inductance of the second inductive element 182 is from 0.1 nH to 2 nH, and the capacitance of the capacitive element 183 is from 1 pF to 5 pF, but they are not limited thereto.

Figure 6:
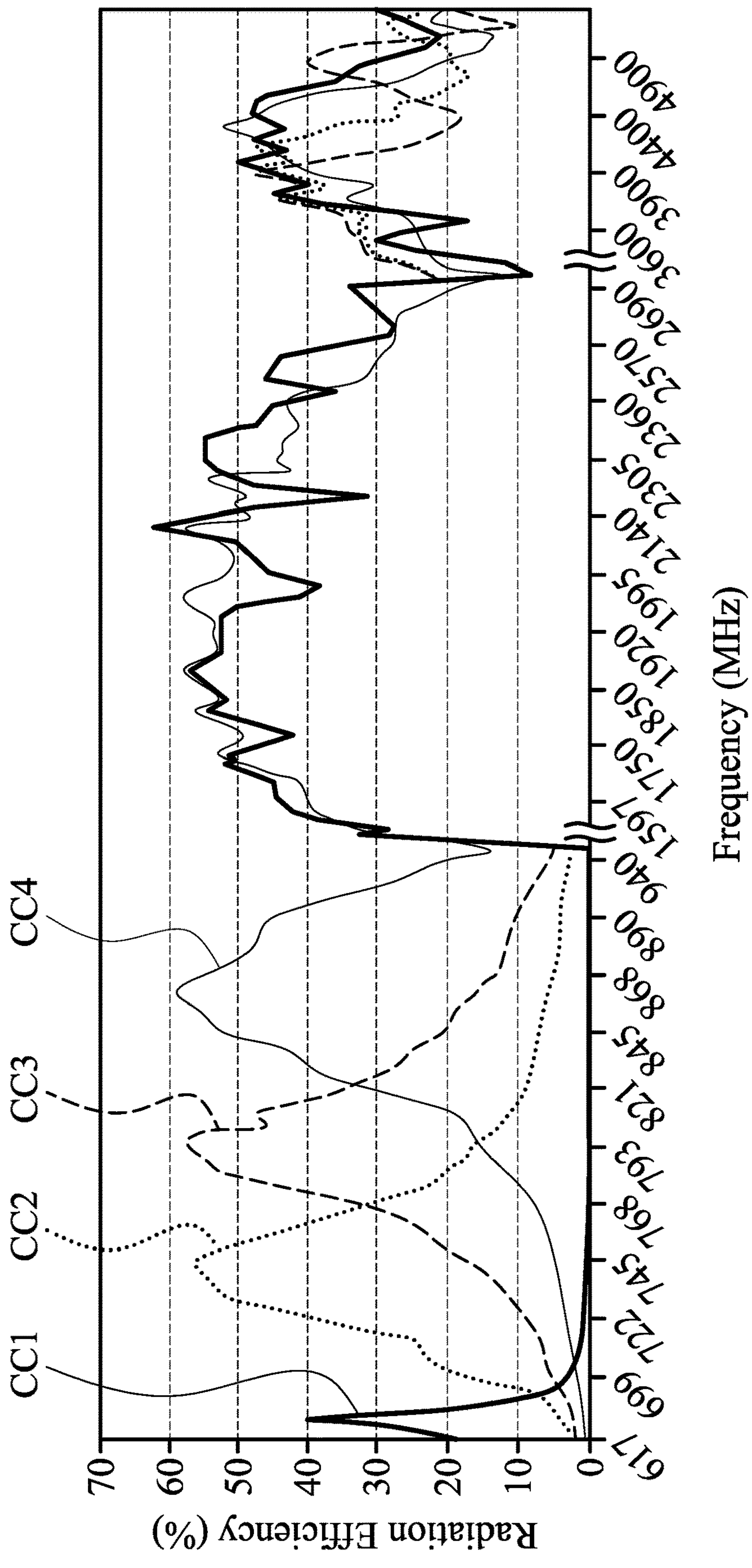
FIG. 6 is a diagram of radiation efficiency of an antenna structure according to an embodiment of the invention.

FIG. 6 is a diagram of radiation efficiency of the antenna structure 100 according to an embodiment of the invention. The horizontal axis represents the operational frequency (MHz), and the vertical axis represents the radiation efficiency (%). As shown in FIG. 6, a first curve CC1 represents the operational characteristics of the antenna structure 100 when the selection circuit 185 selects the capacitive element 183, a second curve CC2 represents the operational characteristics of the antenna structure 100 when the selection circuit 185 selects the open-circuited element 184, a third curve CC3 represents the operational characteristics of the antenna structure 100 when the selection circuit 185 selects the first inductive element 181, and a fourth curve CC4 represents the operational characteristics of the antenna structure 100 when the selection circuit 185 selects the second inductive element 182. According to the measurement of FIG. 6, the incorporation of the tuning circuit 180 can help to significantly increase the operational bandwidth of the first frequency band FB1 of the antenna structure 100. It should be understood that the above design of the tuning circuit 180 is merely exemplary. In other embodiments, the internal structure of the tuning circuit 180 is adjustable according to different requirements.

The invention proposes a novel antenna structure, which is integrated with a metal mechanism element. Since the metal mechanism element is considered as an extension portion of the antenna structure, it does not negatively affect the radiation performance of the antenna structure. In comparison to the conventional design, the invention has the advantages of small size, wide bandwidth, low manufacturing cost, and beautiful device appearance, and therefore it is suitable for application in a variety of mobile communication devices (especially for those with narrow borders).

Note that the above element sizes, element shapes, element parameters, and frequency ranges are not limitations of the invention. An antenna designer can fine-tune these settings or values according to different requirements. It should be understood that the antenna structure of the invention is not limited to the configurations of FIGS. 1-6. The invention may merely include any one or more features of any one or more embodiments of FIGS. 1-6. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a metal mechanism element, having a slot, wherein the metal mechanism element comprises a first grounding portion and a second grounding portion, and wherein the slot is positioned between the first grounding portion and the second grounding portion;

a ground element;

a feeding radiation element, having a feeding point;

a first radiation element, coupled to the feeding radiation element;

a second radiation element, coupled to the feeding radiation element, wherein the second radiation element and the first radiation element substantially extend in opposite directions;

a parasitic radiation element, coupled to the ground element, wherein the parasitic radiation element is adjacent to the first radiation element and the second radiation element;

a tuning circuit, coupled between the first grounding portion and the second grounding portion of the metal mechanism element; and a nonconductive support element, configured to carry the ground element, the feeding radiation element, the first radiation element, the second radiation element, the parasitic radiation element, and the tuning circuit.

2. The antenna structure as claimed in claim 1, wherein the slot of the metal mechanism element substantially has an L-shape.

3. The antenna structure as claimed in claim 1, wherein the slot of the metal mechanism element has a relatively wide open end and a relatively narrow closed end.

4. The antenna structure as claimed in claim 3, wherein a distance between the tuning circuit and the closed end of the slot is from 3 mm to 7 mm.

5. The antenna structure as claimed in claim 1, wherein the first radiation element substantially has a Z-shape.

6. The antenna structure as claimed in claim 1, wherein the first radiation element further comprises a terminal widening portion.

7. The antenna structure as claimed in claim 1, wherein the second radiation element substantially has a variable-width straight-line shape.

8. The antenna structure as claimed in claim 1, wherein the second radiation element comprises a narrow portion and a wide portion, and the wide portion is coupled through the narrow portion to the feeding radiation element.

9. The antenna structure as claimed in claim 1, wherein the parasitic radiation element substantially has an L-shape.

10. The antenna structure as claimed in claim 1, wherein the parasitic radiation element further has a corner notch.

11. The antenna structure as claimed in claim 1, wherein a first coupling gap is formed between the parasitic radiation element and the first radiation element, wherein a second coupling gap is formed between the parasitic radiation element and the second radiation element, and wherein a width of each of the first coupling gap and the second coupling gap is from 0.8 mm to 1.2 mm.

12. The antenna structure as claimed in claim 1, wherein the nonconductive support element has a first surface, a second surface, and a third surface, wherein the first surface is positioned between the second surface and the third surface, and wherein the second surface and the third surface are substantially perpendicular to the first surface.

13. The antenna structure as claimed in claim 12, wherein both the first radiation element and the parasitic radiation element extend from the first surface onto the second surface of the nonconductive support element.

14. The antenna structure as claimed in claim 12, wherein the second radiation element is disposed on the first surface of the nonconductive support element, and wherein the ground element is disposed on the third surface of the nonconductive support element.

15. The antenna structure as claimed in claim 1, wherein the antenna structure covers a first frequency band, a second frequency band, a third frequency band, and a fourth frequency band, wherein the first frequency band is from 617 MHz to 960 MHz, wherein the second frequency band is from 1710 MHz to 2690 MHz, wherein the third frequency band is from 3300 MHz to 5000 MHz, and wherein the fourth frequency band is from 5150 MHz to 5925 MHz.

16. The antenna structure as claimed in claim 15, wherein a length of the slot is substantially equal to 0.25 wavelength of the first frequency band.

17. The antenna structure as claimed in claim 15, wherein a total length of the feeding radiation element and the first radiation element is substantially equal to 0.25 wavelength of the second frequency band.

18. The antenna structure as claimed in claim 15, wherein a total length of the feeding radiation element and the second radiation element is substantially equal to 0.25 wavelength of the third frequency band.

19. The antenna structure as claimed in claim 15, wherein a length of the parasitic radiation element is substantially equal to 0.25 wavelength of the second frequency band.

20. The antenna structure as claimed in claim 1, wherein the tuning circuit comprises:

a first inductive element;

a second inductive element;

a capacitive element;

an open-circuited element; and a selection circuit, selecting one of the first inductive element, the second inductive element, the capacitive element, and the open-circuited element as a target element according to a control signal, wherein the selected target element is coupled between the first grounding portion and the second grounding portion of the metal mechanism element.

* * * * *